(12) United States Patent
De Clerck et al.

(10) Patent No.: US 10,986,189 B2
(45) Date of Patent: Apr. 20, 2021

(54) INTERMEDIATE BROKER WITH MULTI-SESSION RECORDING

(71) Applicant: AWINGU NV, Ghent (BE)

(72) Inventors: Pieter De Clerck, Zwijnaarde (BE); Kurt Bonne, Haren (BE); Christof Debaes, Lembeek (BE)

(73) Assignee: AWINGU NV, Ghent (BE)

( * ) Notice: Subject to any disclaimer, the term of this patent is extended or adjusted under 35 U.S.C. 154(b) by 0 days.

(21) Appl. No.: 16/469,401

(22) PCT Filed: Dec. 14, 2017

(86) PCT No.: PCT/EP2017/082916
§ 371 (c)(1),
(2) Date: Jun. 13, 2019

(87) PCT Pub. No.: WO2018/109119
PCT Pub. Date: Jun. 21, 2018

(65) Prior Publication Data
US 2019/0320027 A1   Oct. 17, 2019

(30) Foreign Application Priority Data
Dec. 15, 2016   (EP) .................................... 16204263

(51) Int. Cl.
*H04L 29/08*   (2006.01)

(52) U.S. Cl.
CPC .......... *H04L 67/145* (2013.01); *H04L 67/025* (2013.01); *H04L 67/141* (2013.01); *H04L 67/22* (2013.01); *H04L 67/36* (2013.01); *H04L 67/02* (2013.01); *H04L 67/14* (2013.01)

(58) Field of Classification Search
CPC ...... H04L 67/143; H04L 67/02; H04L 51/046
See application file for complete search history.

(56) References Cited

U.S. PATENT DOCUMENTS

| | | | |
|---|---|---|---|
| 6,961,776 B1 * | 11/2005 | Buckingham | G06F 9/541 |
| | | | 709/219 |
| 7,386,855 B2 | 6/2008 | Song et al. | |
| 7,529,798 B2 * | 5/2009 | Rust | G06Q 10/10 |
| | | | 709/204 |

(Continued)

OTHER PUBLICATIONS

International Search Report from Application No. PCT/EP2017/082916, dated Feb. 23, 2018.

(Continued)

*Primary Examiner* — Lashonda T Jacobs
(74) *Attorney, Agent, or Firm* — Workman Nydegger

(57) ABSTRACT

A computer-implemented method for operating an intermediate broker with multi-session recording, wherein the method comprises the steps of: an intermediate broker providing an application session on an application server as a user session to a user client; a recording module recording the user session in a session recording; upon termination of the user session, the intermediate broker providing a session continuation link for continuing the application session; upon activation of the session continuation link, the intermediate broker continuing the application session on the application server as a further user session to a further user client; the recording module recording the further user session in a further session recording.

16 Claims, 8 Drawing Sheets

(56) References Cited

U.S. PATENT DOCUMENTS

| | | | |
|---|---|---|---|
| 7,747,688 B2* | 6/2010 | Narayanaswami | H04L 67/14 709/204 |
| 9,420,014 B2* | 8/2016 | Pegg | H04L 65/4015 |
| 9,489,114 B2* | 11/2016 | Coplen | H04L 51/04 |
| 9,866,638 B2* | 1/2018 | Heymann | H04L 67/14 |
| 10,749,970 B1* | 8/2020 | Fisi | H04L 67/18 |
| 2002/0065912 A1* | 5/2002 | Catchpole | G06F 16/954 709/224 |
| 2008/0189365 A1* | 8/2008 | Narayanaswami | H04L 67/142 709/204 |
| 2008/0289029 A1* | 11/2008 | Kim | G06F 16/9577 726/12 |
| 2009/0063690 A1* | 3/2009 | Verthein | H04L 67/142 709/228 |
| 2009/0138606 A1* | 5/2009 | Moran | H04L 67/14 709/227 |
| 2011/0173239 A1* | 7/2011 | Sayed | G06F 11/3414 707/821 |
| 2011/0202599 A1* | 8/2011 | Yuan | H04L 67/14 709/203 |
| 2011/0296038 A1* | 12/2011 | Mandre | H04L 67/142 709/228 |
| 2014/0351370 A1* | 11/2014 | Ashley | H04L 67/148 709/217 |
| 2019/0243858 A1* | 8/2019 | Gueta | H04L 67/42 |
| 2019/0361717 A1* | 11/2019 | Santos | G09B 5/00 |
| 2020/0106809 A1* | 4/2020 | Raj | H04L 69/16 |
| 2020/0351356 A1* | 11/2020 | Sundaresan | H04W 4/21 |

OTHER PUBLICATIONS

Extended European Search Report from EP Application No. 16204263.4, dated May 17, 2017.

* cited by examiner

INTERMEDIATE BROKER WITH MULTI-SESSION RECORDING

FIELD OF THE INVENTION

The present invention generally relates to the recording of an application session on an application server.

BACKGROUND OF THE INVENTION

Recording an application session of an application running on an application server and then archive that recording for reference when needed is useful in several use cases in sectors such as finance, government, education, healthcare, IT, etc. For example, when rolling-out a new app to users, recording application sessions of these users and archiving them allows an administrator to review the application sessions later to assess how the app has been performing and how it has been adopted by the users. Another use case where recording application sessions is useful is for example for auditing purposes. Knowing exactly who did what on which application server and what the results of those actions were can be very useful to an administrator of a server network. All application sessions or application sessions based on users, computers, roles or use of privilege can be audited. Recording which users accessed which systems, what commands they executed, with what privilege, and the exact changes they made to key files and configurations is made possible when capturing on-screen activity of user clients of such users within a published application session or hosted shared desktop. In other words, an indexed, high-fidelity recording of each individual privileged session provides an administrator with a complete picture of exactly what happened—and who did it—on any managed system, at any given time, by any given user. This helps an administrator identifying inappropriate use of privilege or the source of a security incident. This knowledge can also be used in troubleshooting application issues. Let's say a user calls a helpdesk with an issue that is hard to reproduce. The application session of the user is recorded and the recording comprises everything the user has done by means of its user client in that session, including the steps the user took prior to the issues manifesting themselves. An administrator can search for and quickly find specific events in an application session, jump directly to that event in the session capture and replay any portion of the session to see every action taken by a user and every system response.

Recording an application session of an application running on an application server and then archive that recording for reference when needed is useful when for example a user wants to be able to access his application session from a plurality of devices comprising a suitable user client. For example, a user works on a desktop computer and his application session is recorded and archived. The same user may be able to access the application session from another device, for example another desktop computer, a laptop computer, a tablet or a smartphone respectively comprising a suitable user client. This way, actions undertaken by a user during an application session can be accessed and identified from a plurality of devices comprising a suitable user client. For example, a student running an application session of an application on a desktop computer at his school can record his application session and is still able to access the recorded application session from his laptop at home. Such a system is for example described in US2008/0189365A1 of IBM Corporation published on Aug. 7, 2008.

The feature XenApp 7.6 of Citrix, called Session Recording, enables an administrator to record active virtual app and server hosted desktop sessions, based on user, application or application server and then archive that recording for reference when needed. In other words, the Session Recording allows administrators to record on-screen user session activity and play it back at a later time as required. The Session Recording comprises a Session Recording Agent installed on Virtual Delivery Agent machines and recording the session data and sending it to the Session Recording Server. The Session Recording Server processes the data and stores it in a Session Recording Database on a SQL server. A Session Recording Player is used to list and playback the recordings and a Session Recording Policy console controls the recording behaviour. Administrators can search for application sessions based on specific criteria such as domain account, site, group, application or a specific date and time since this info was all captured as metadata during the recording.

With the Session Recording of Citrix, a plurality of application sessions can be recorded. Such an application session is initiated by a particular user, by for example logging in to the Citrix system and initiating an application session running a virtual windows desktop or an application session running a Word processing application instance. It is thus clear that each application session is initiated by and thus assigned to a particular user. When a plurality of application sessions is recorded by Session Recording of Citrix, each of the recorded application sessions thus corresponds to a particular user. Typically, in such a context only a user with administrator privileges, who is allowed to view and/or audit the recorded application sessions of all the users for which such recordings have been made will be the only one whom can access and visualize recordings of application sessions of these users. During such an auditing activity, typically such an administrative user will be able to filter recorded application sessions for each user. This means that the user with administrative privileges will be able to select recorded application sessions for each particular user for subsequent playback.

In the context of a broker, the Session Recording of Citrix or similar systems present specific disadvantages, more particularly when an application session involves a plurality of user sessions. A broker acts as an intermediate platform between backend remote application servers and user clients for accessing these remote applications by authorised users. Such an intermediate broker for example allows for a first user to initiate an application session to initiate a sequence of tasks and can then for example request further users to assist in or continue performing at least a part of this sequence of tasks. According to prior art systems the recording system would first record the application session as assigned to the first user which initiated this application session. Subsequently, all further users would also generate further recordings assigned to these further users when accessing their further application sessions. A sequence of tasks performed by a plurality of different users will thus result in a plurality of unrelated recordings of application sessions, which cannot be efficiently audited by users with administrative privileges, and are not accessible in a user friendly way to the plurality of users involved in the sequence of tasks to be performed.

It is an objective of the present invention to disclose a method and a system for operating an intermediate broker with multi-session recording and the intermediate broker that overcome the above identified shortcomings of existing solutions. More particularly, it is an objective to disclose a method and a system for operating an intermediate broker which make multi-session recording possible.

SUMMARY OF THE INVENTION

According to a first aspect of the present invention, the above defined objectives are realized by a computer-implemented method for operating an intermediate broker with multi-session recording, wherein the method comprises the steps of:
- an intermediate broker providing an application session on an application server as a user session to a user client;
- a recording module recording the user session in a session recording;
- upon termination of the user session, the intermediate broker providing a session continuation link for continuing the application session;
- upon activation of the session continuation link, the intermediate broker continuing the application session on the application server as a further user session to a further user client;
- the recording module recording the further user session in a further session recording.

With the method according to the present invention, a further user client is able to sequentially access, visualize and further continue an application session of a user client, even upon termination of the user session of the application session of the user client. In other words, a user client is able to share the application session of an application running on an application server with a further user client, even upon termination of the user session of the user client as the intermediate broker according to the present invention continues the application session on the application server as a further user session for the further user client. The chronology of the activity and the activity of a user through the user client are recorded in a session recording and may further be made accessible and may be visualized through the further user client. A user may perform further actions through the further user client in his further user session within the same application session as the user session of the user client, and the chronology of his activity and his activity are recorded in a further session recording. For example, a user of a user client may request a user of a further user client to assist or continue in performing at least part of a sequence of tasks the user initiated through the user client when initiating an application session.

In accordance with the present invention, an intermediate broker acts as an intermediate platform between one or more user clients of applications and backend servers comprising one or more remote application servers on which the applications run. An intermediate broker according to the present invention is a connection broker adapted to assign resources to user clients, and to provide user clients with consistent, reliable access to remote application servers. An intermediate broker may be a web broker adapted to mediate between a user client such as a browser and a remote application server. Alternatively, an intermediate broker may be adapted to mediate between a dedicated client application which is not a client browser, and a remote application server. A web broker is to be understood as a service broker in service-oriented architecture, i.e. as a broker adapted to mediate between a client browser and a remote application server. In other words, in the context of the present invention, an intermediate broker links each user session to at least one application session.

According to the present invention, a user of a user client is for example a user of an application, i.e. a first person, and a user of a further user client is for example a different user of the same application, i.e. a different person than the first person. Alternatively, a user of a further user client is for example the same user as the user of the user client, i.e. the same person than the first person. A user client is for example a browser of a first user device of a user, for example a browser running on an electronic device, on a desktop computer or on a laptop or on a tablet or on a smartphone or on a smartwatch of the user, and a further user client is for example a browser of another user device of the same user different from the first user device, for example a browser running the electronic device, the desktop computer or the laptop or the tablet or the smartphone or the smartwatch of the same user. This way, with the method of the invention, a user of an application can share his application session on two different electronic devices. Alternatively, a user client is for example a browser of a first user device of a user, for example a browser running on an electronic device, on a desktop computer or on a laptop or on a tablet or on a smartphone or on a smartwatch of the user, and a further user client is for example a browser of a user device of a further user different from the user, for example a browser running on an electronic device, a desktop computer or a laptop or a tablet or the smartphone or the smartwatch of a further user different from the user. This way, with the method of the invention, a user of an application can share his application session on two different electronic devices. This way, with the method of the invention, two different people can share the same application session on an application server. A user client is for example a browser such as for example Google Chrome, Safari, Mozilla Firefox, Internet Explorer, Microsoft Edge, Opera, etc.

According to an optional aspect of the invention, the session recording and at least one further session recording are separate from each other.

In other words, the session recording and at least one further session recording are independently recorded by the recording module according to the present invention. The recording module records the session recording as one part and the recording module records at least one further session recording as another part different and independent from the part corresponding to the session recording. The recording module records the session recording and at least one further session recording as independent parts. This way, the session recording and at least one further session recording are handled as different parts by the recording module. The session recording and at least one further session recording are also handled as different parts by the intermediate broker according to the present invention. This for example allows the recording module to store the session recording at one location, for example at one location in the recording module, and to further independently store at least one further session recording at another location different from the first location, for example at another location in the recording module. This way, the recording module must not retrieve the session recording before recording at least one further session recording, as the session recording and at least one further session recording do not form a single, integral and continuous recording stored on the recording module. This saves time and processing power to the recording module. The service broker described in US2008/0189365 does not disclose a recording module which records a further user session of a continued application session in a further session recording.

According to an optional aspect of the invention, the recording module aggregates the session recording and the at least one further session recording in an aggregated session recording.

This way, the recording module allows a multi-session recording wherein the activity of a user through a user client and the activity of a user through a further user client within the same application session are sequentially logged and can be sequentially visualized in a single un-fragmented session recording. This allows an efficient audit by users with administrative privileges of sequences of actions performed by a plurality of different users clients in a single recording of user sessions of application sessions.

According to an optional aspect of the invention, upon activation of the session continuation link, the intermediate broker provides the option of viewing at the further user client, the session recording of the terminated user session of the user continuation link.

This way, a sequence of actions performed by a user of the user client is recorded in a session recording of the terminated user session of the user continuation link and is accessible to one or more users of further user clients involved in the sequence of actions to be performed in a user friendly way. Any further user client can play the actions of the user client back and a user of any further user client becomes aware of the chronology of these actions in an efficient way. A user of the further user client has then easy access to the chronology of these actions and can better identify which actions led to the state of the application session the further user client retrieved upon activation of the session continuation link. For example, in the context of troubleshooting application issues, a user with privileges can identify via its user client which actions were undertaken prior to an issue manifesting itself.

According to an optional aspect of the invention, upon activation of the session continuation link, the intermediate broker displays, at the further user client, the session recording of the terminated user session of the user continuation link, before continuation of the application session as the further user session at the further user client.

By displaying the session recording of the terminated user session of the user continuation link, the intermediate broker allows any further user client to immediately start with the application session in a state in which the user client terminated the user session. In other words, the further user client picks the application session up where the user client terminated it. This way, a user of the further user client does not repeat a task previously completed by a user of the user client, which improves the efficiency of the method.

According to an optional aspect of the invention, upon activation of the session continuation link of a previous further user session, the intermediate broker provides the option of viewing, at the next further user client, the aggregated session recording of the terminated previous further user session of the user continuation link.

The next further user client may be a user client different from the user client and the further user client. Alternatively, the next further user client is the user client or the further user client.

This way, a sequence of actions performed by a user of the user client and of actions performed by a user of a further user client is recorded in a session recording of the terminated previous further user session of the user continuation link and is accessible to the plurality of next further user clients involved in the sequence of actions to be performed in a user friendly way. Any next further user client can play the actions of the user client and of the further user client back and a user of any next further user client becomes aware of the chronology of these actions in an efficient way. A user of the next further user client has then easy access to the chronology of these actions and can better identify which actions led to the state of the application session the next further user client retrieved upon activation of the session continuation link. For example, in the context of troubleshooting application issues, a user with privileges can identify which actions were undertaken prior to an issue manifesting itself.

According to an optional aspect of the invention, upon activation of the session continuation link of a previous further user session, the intermediate broker displays, at the next further user client, the aggregated session recording of the terminated previous further user session of the user continuation link.

By displaying the session recording of the terminated user session of the user continuation link, the intermediate broker allows any next further user client to immediately start with the application session in a state in which the further user client terminated the user session. In other words, the next further user client picks the application session up where the further user client terminated it. This way, a user of the next further user client does not repeat a task previously completed by a user of the further user client, which improves the efficiency of the method.

According to an optional aspect of the invention, after termination of the further user session, the intermediate broker provides the option of viewing, at the user client of the previous user session, the aggregated session recording.

This way, after termination of a further user session, the first user client can play the actions of the further user client back and a user of the user client can therefore identify which actions were performed by a user of the further user client in his user session of the application session.

According to an optional aspect of the invention:
- the recording module is further adapted to store a user ID associated with a session recording and to store a further user ID associated with a further session recording; and
- the intermediate broker is further configured to prevent viewing of a session recording or at least one further session recording in function of user permissions to view the session recording and/or the further session recording in function of associated user IDs.

According to an optional aspect of the invention, the intermediate broker is further configured to prevent viewing of parts of the aggregated session recording in function of the associated user IDs.

This way, it is also possible to associate one or more user IDs with the session recording and/or at least one further session recording when the recording module stores the session recording and/or at least one further session recording. The intermediate broker then blocks the viewing of the session recording and/or at least one further session recording in function of user permissions to view this recording in function of the associated user IDs. For example, the recording module may record a session recording of a first user session of an application session of a first user with a user ID1. The recording module stores the session recording and the user ID1 associated with the session recording. The first user may terminate his first user session. Upon termination of the first user session, an intermediate broker provides a session continuation link to a further user with a user ID2 for continuing the application session. Upon activation of the session continuation link, the intermediate broker continues the application session on the application server as a further user session to the further user client. The recording module then records a further session recording of the further user session of the application session of the further user with a user ID2. The recording module stores the further session recording and the user ID2 associated with the further session recording. The recording module optionally aggregates the session recording and the further session recording in an aggregated session recording. The further user with the user ID2 then terminates his further user session. Upon termination of the further user session, the intermediate broker provides a session continuation link back to the first user with the user ID1 for continuing the application session. Upon activation of the session continuation link, the intermediate broker continues the application session on the application server as a next further user session to the first user client. However, the first user with user ID1 may not own permissions to replay the further session recording of the further user with user ID2. The first user with user ID is therefore not allowed to view the further session recording of the further user with user ID2, and the intermediate broker does not display the further session recording of the further user with user ID2 to the first user with user ID1. The first user with user ID1 owns permissions to replay the session recording, and the intermediate broker can display the session recording of the first user with user ID1 to the first user with user ID1. It is clear in this case that users may replay parts and/or view an entire session recording, and/or replay part and/or view at least one entire further session recording, depending on the permissions associated with each user ID, depending on which the intermediate broker prevents viewing or not of parts or of the entire session recording and/or of the further session recording and/or of the next further session recording, and that it is possible that a user is allowed to only view one or more parts of the aggregated session recording depending on the user permissions associated with his user ID.

According to an optional aspect of the invention:
the recording module records only selected parts of the user session in the session recording; and
upon activation of the session continuation link, the intermediate broker provides the option of viewing at the further user client, the session recording of the terminated user session of the user continuation link.

This way, the recording and the displaying of the session recording can be optimized. The user session can be recorded entirely or only selected parts of the user session can be recorded and can then be displayed by the further user client. This can for example be useful when the application session deals with sensitive data which can only be displayed to user client with privileges. Other user clients may not display given selected parts of the user session of the user client. For example, icons and/or files and/or documents and/or notes in a document etc. of a user session may not be recorded in the session recording and may therefore not be visible through a further user client. Alternatively, time slots of a user session may be recorded in the session recording. For example, only the last 5 minutes or the last 10 minutes of a user session may be recorded in the session recording. This way, a user of a further user client can view the session recording of the terminated user session and can simply and rapidly become aware of the last events of the terminated user session. In another example, a user session may be recorded every 10 or 5 minutes for for example one minute. This way, the session recording comprises a time-lapse of events generated during the user session. Alternatively, this can be implemented around detected user generated events. For example, the recording module can start recording the user session only when a predefined user generated event is detected, for example a predefined keystroke, a predefined mouse event, etc. Alternatively, the intermediate broker can for example provide the option of viewing the session recording of the terminated user session of the user continuation link to a further user client only before or only after a predefined user generated event is detected, such as a predefined keystroke, a predefined mouse event, etc.

According to an optional aspect of the invention, the session recording comprises one or more of the following:
one or more screenshots of the user session;
one or more keystrokes of the user session;
one or more events generated by a pointer of the user client and corresponding positions of the pointer in the user session;
one or more events generated on the user client via a touch screen;
one or more audio tracks of the user session.

According to a second aspect of the invention, there is provided a system for operating an intermediate broker with multi-session recording, the system performing the computer implemented method according to a first aspect of the invention.

With the system according to the present invention, a further user client is able to sequentially access, visualize and further continue an application session of a user client, even upon termination of the user session of the application session of the user client. In other words, a user client is able to share the application session of an application running on an application server with a further user client, even upon termination of the user session of the user client as the intermediate broker according to the present invention continues the application session on the application server as a further user session for the further user client. The chronology of the activity and the activity of a user of the user client are recorded in a session recording and may further be made accessible and may be visualized by a user of the further user client. A user of the further client may perform further actions in his further user session within the same application session as the user session of the user client, and the chronology of his activity and his activity are recorded in a further session recording. For example, a user of a user client may request a user of a further user client to assist or continue in performing at least part of a sequence of tasks the user of the user client initiated when initiating an application session.

According to a third aspect of the invention, there is provided an intermediate broker according to a second aspect of the invention, wherein the recording module runs on the intermediate broker.

An intermediate broker acts as an intermediate platform between one or more user clients of applications and back-end servers comprising one or more remote application servers on which the applications run. An intermediate broker according to the present invention is a connection broker adapted to assign resources to user clients, and to provide user clients with consistent, reliable access to remote application servers. An intermediate broker may be a web broker adapted to mediate between a user client such as a browser and a remote application server. Alternatively, an intermediate broker may be adapted to mediate between a dedicated client application which is not a client browser, and a remote application server. A web broker is to be understood as a service broker in service-oriented architecture, i.e. as a broker adapted to mediate between a user client such as a browser and a remote application server. In other words, in the context of the present invention, an intermediate broker links each user session to at least one application session. The recording module runs on the intermediate broker. Alternatively, the recording module runs as a separate unit from the intermediate broker and from the application server. Alternatively, the recording module runs on one or more application servers.

According to an optional aspect of the invention, the intermediate broker comprises an application streamer adapted to:
  generate a representation of a web page incorporating the application session; and
  stream the representation of the web page to the user client and/or to the further user client.

The user devices on which the user client and/or the further user client and/or the next further user client are running may not comprise identical operating systems or applications. The intermediate broker streams the selected content to the user clients, for example to the browsers of user devices, independently from the nature and the version of the operating systems of the user devices, independently from the nature and the version of the user clients, and independently from the applications and from the version of the applications running on the application servers. The user sessions therefore must not be independently configured to be provided with visibility on the application sessions. In other words, user clients which do not support direct access to application sessions may however be streamed the application sessions by the broker. This makes application sessions universal. Additionally, only a browser, for example a HTML5 browser, may be required at the side of the user device in order to be streamed application sessions. This simple and light implementation at the side of the user device minimizes the configuration of the user client.

According to an optional aspect of the invention, the recording module records one or more of the following in the session recording:
  canvas stream;
  client user input stream.

Canvas stream comprises screen updates of a user session, pointer events and pointer positions of a user session for example pointer movements and/or pointer clicks and/or taps on a touch screen and/or swipes on a touch screen etc., window information of a user session, audio of a user session recorded for example from a microphone of a user device, etc. Client user input stream comprises one or more of the following: keystrokes of a user session, pointer events and pointer positions of a user session for example pointer movements and/or pointer clicks and/or taps on a touch screen and/or swipes on a touch screen etc., audio of a user session recorded for example from a microphone of a user device, video recorded for example from a webcam of a user device.

DETAILED DESCRIPTION OF EMBODIMENT(S)

Figure 1:
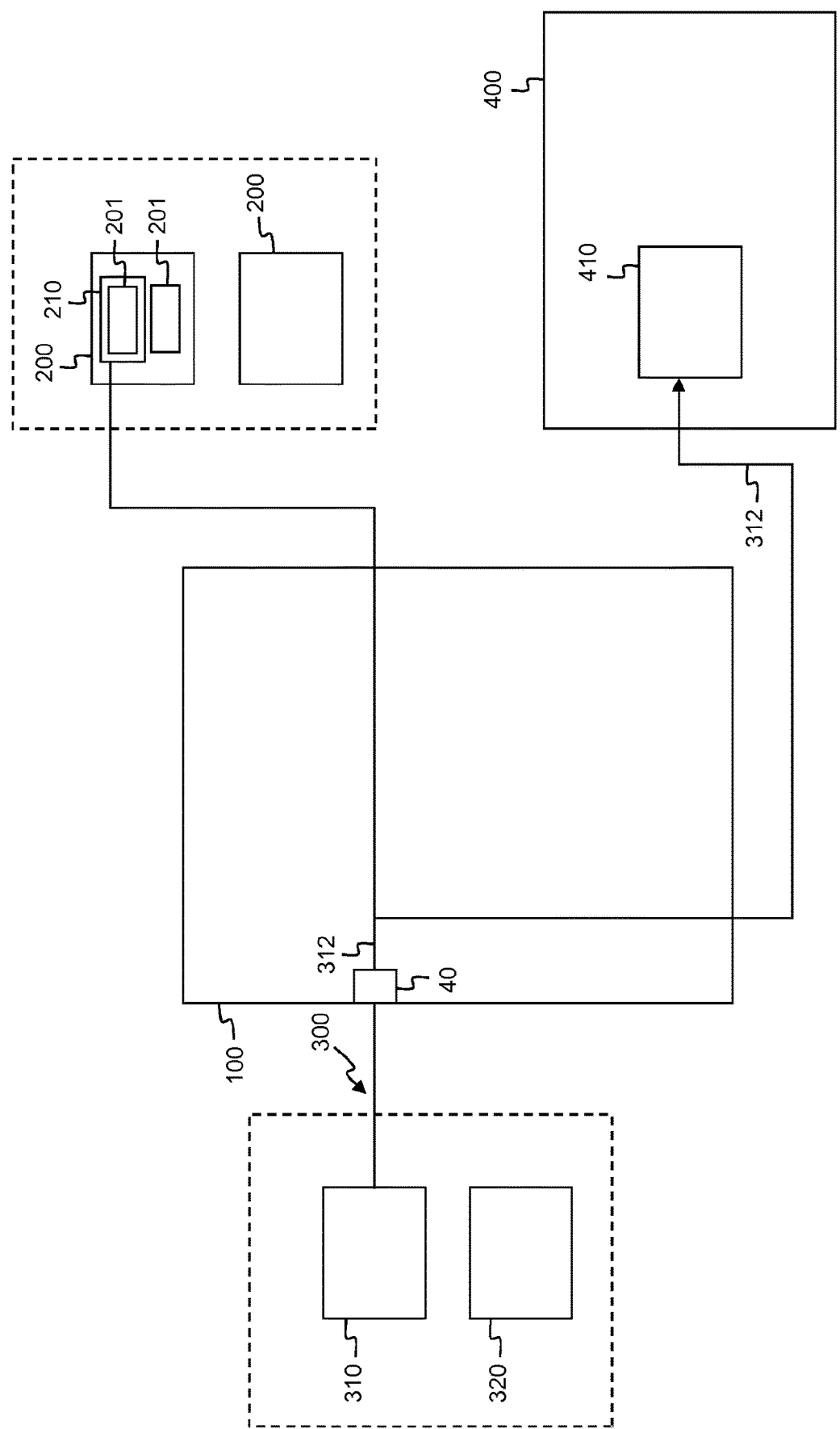
FIG. 1 schematically illustrates an embodiment of a system for operating an intermediate broker with multi-session recording with a user session to a user client.

According to an embodiment shown in FIG. 1, a system according to the present invention comprises a user client 310, a further user client 320, an intermediate broker 100, a recording module 400 and an application server 200. The user client 310 is for example a browser in which an application 201 is launched, for example a first browser, and the further user client 320 is for example a different browser in which the same application 201 is launched, for example a different browser than the first browser. According to an alternative embodiment, the user client 310 is for example a browser of a first electronic device of a user, for example of a desktop computer or of a laptop or of a tablet or of a smartphone or of a smartwatch, and the further user client 320 is for example a browser of another electronic device of the same user different from the first electronic device, for example the desktop computer or the laptop or the tablet or the smartphone or the smartwatch of the same user. The application server 200 comprises a plurality of applications 201. The intermediate broker 100 is for example a web broker. The intermediate broker 100 provides an application session 210 on an application server 200 as a user session 312 to the user client 310. The intermediate broker 100 comprises an application streamer 40 which generates a representation of a web page 300 incorporating the application session 210 and streams the representation of the web page 300 to the user client 310. The intermediate broker 100 provides the recording module 400 with the user session 312 and the recording module 400 records the user session 312 in a session recording 410. The recording module 400 records a canvas stream and/or client user input stream in the session recording 410. The recording module 400 is a unit independent from the intermediate broker 100 and from the application server 200. According to an alternative embodiment, the intermediate broker 100 comprises recording module 400. According to a further alternative embodiment, one or more application servers 200 comprise the recording module 400.

Figure 2:
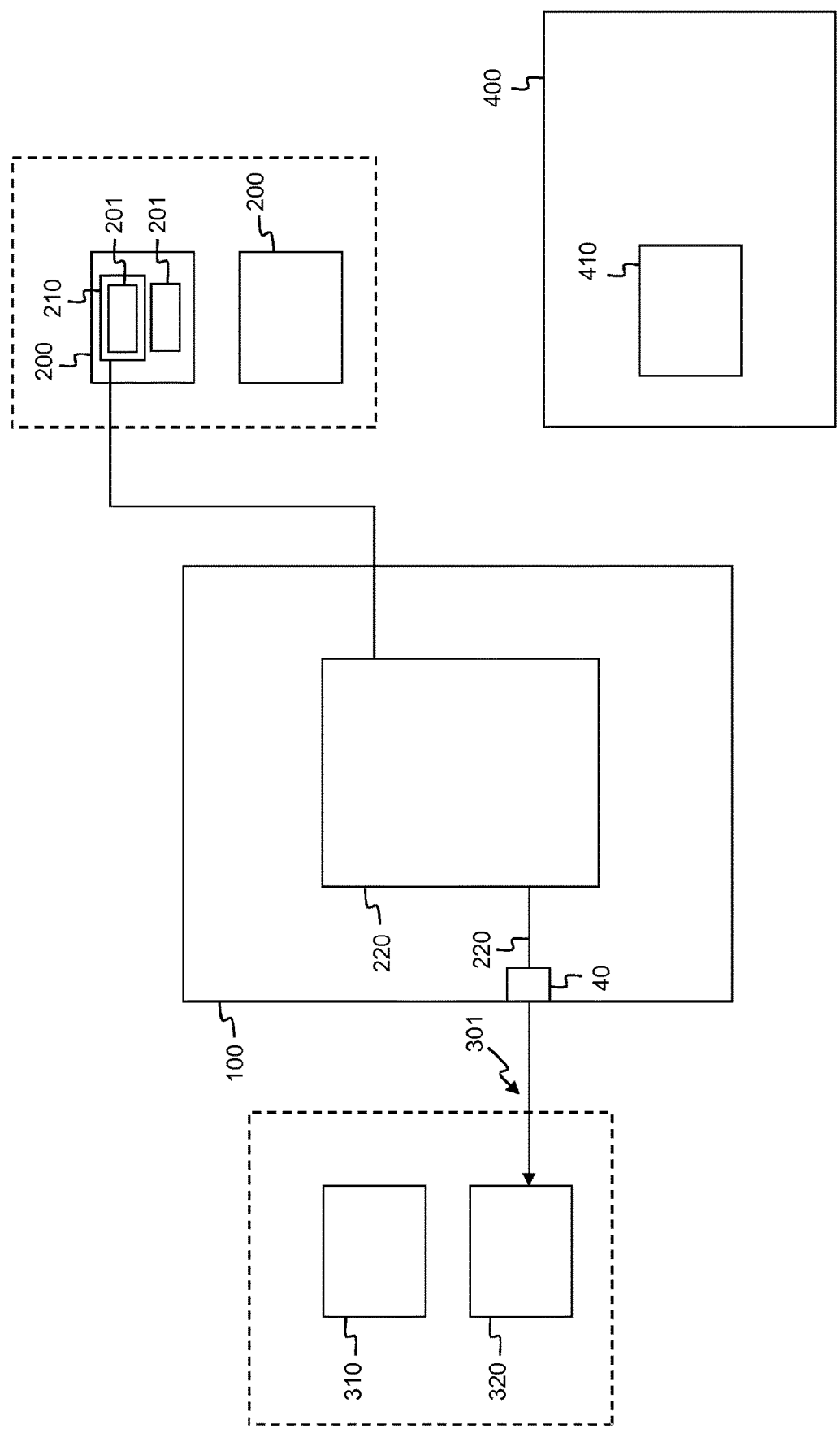
FIG. 2 schematically illustrates an embodiment of a system for operating an intermediate broker with multi-session recording wherein the user session 312 is terminated.

According to an embodiment shown in FIG. 2, a system according to the present invention comprises a user client 310, a further user client 320, an intermediate broker 100, a recording module 400 and an application server 200. The user client 310 is for example a browser in which an application 201 is launched, for example a first browser, and the further user client 320 is for example a different browser in which the same application 201 is launched, for example a different browser than the first browser. According to an alternative embodiment, the user client 310 is for example a browser of a first electronic device of a user, for example of a desktop computer or of a laptop or of a tablet or of a smartphone or of a smartwatch, and the further user client 320 is for example a browser of another electronic device of the same user different from the first electronic device, for example the desktop computer or the laptop or the tablet or the smartphone or the smartwatch of the same user. The application server 200 comprises a plurality of applications 201. The intermediate broker 100 is for example a web broker. The user session 312 of the user client 310 as depicted on FIG. 1 is now terminated. The intermediate broker 100 provides a session continuation link 220 for continuing the application session 210 to the further user client 320. The recording module 400 still comprises the session recording 410. The intermediate broker 100 comprises an application streamer 40 which generates a representation of a web page 301 incorporating the session continuation link 220 and streams the representation of the web page 301 to the further user client 320. The recording module 400 is a unit independent from the intermediate broker 100 and from the application server 200. According to an alternative embodiment, the intermediate broker 100 comprises recording module 400. According to a further alternative embodiment, one or more application servers 200 comprise the recording module 400.

Figure 3:
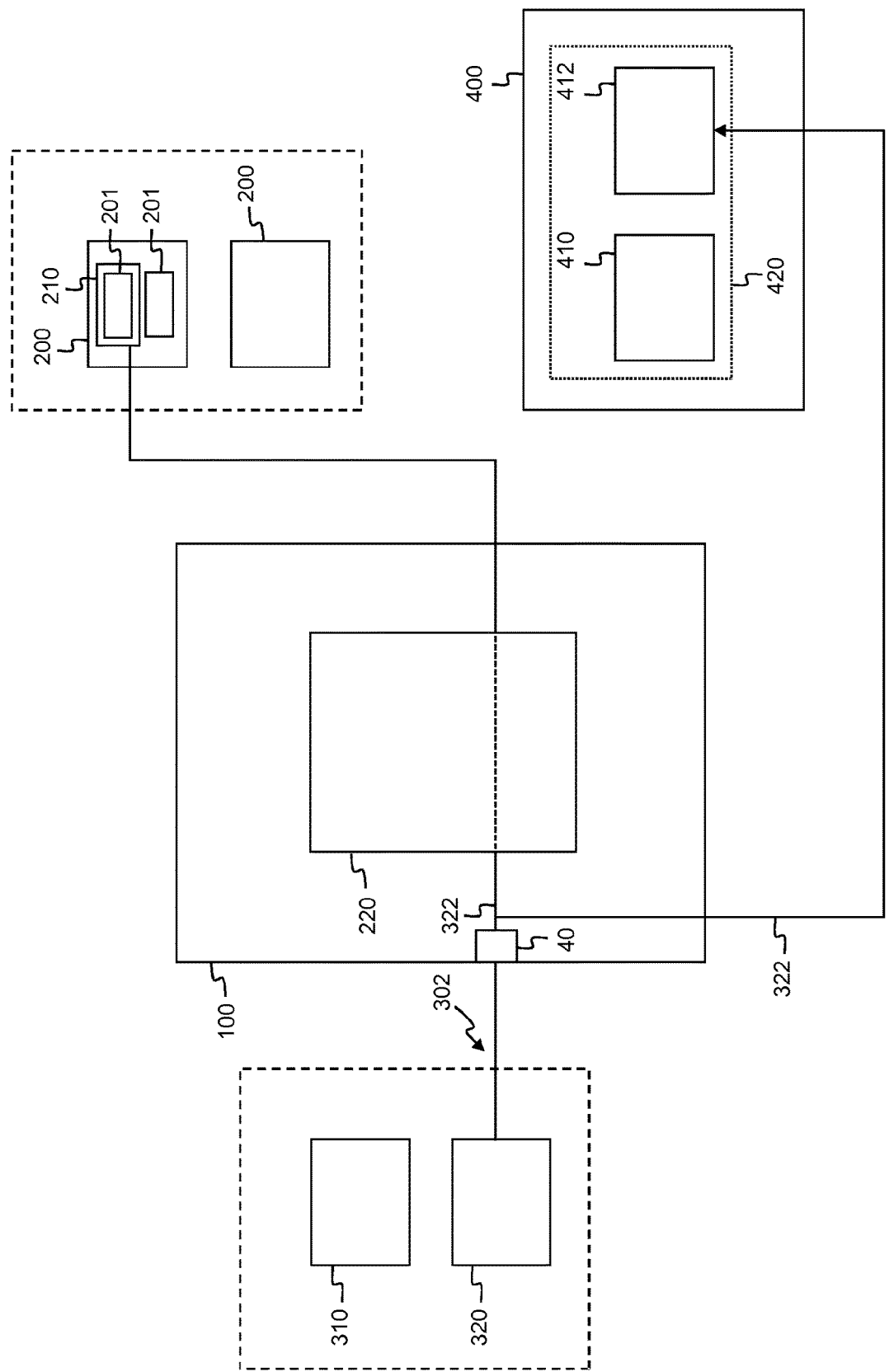
FIG. 3 schematically illustrates an embodiment of a system for operating an intermediate broker with multi-session recording with a further user session to a further user client.

According to an embodiment shown in FIG. 3, a system according to the present invention comprises a user client 310, a further user client 320, an intermediate broker 100, a recording module 400 and an application server 200. The user client 310 is for example a browser in which an application 201 is launched, for example a first browser, and the further user client 320 is for example a different browser in which the same application 201 is launched, for example a different browser than the first browser. According to an alternative embodiment, the user client 310 is for example a browser of a first electronic device of a user, for example of a desktop computer or of a laptop or of a tablet or of a smartphone or of a smartwatch, and the further user client 320 is for example a browser of another electronic device of the same user different from the first electronic device, for example the desktop computer or the laptop or the tablet or the smartphone or the smartwatch of the same user. The application server 200 comprises a plurality of applications 201. The intermediate broker 100 is for example a web broker. Upon activation of a session continuation link 220, the intermediate broker 100 continues the application session 210 of the user session 312 of FIG. 1 on the application server 200 as a further user session 322 to the further user client 320. The intermediate broker 100 comprises an application streamer 40 which generates a representation of a web page 302 incorporating the application session 210 and streams the representation of the web page 302 to the further user client 320. Upon activation of the session continuation link 220, the intermediate broker 100 provides the option of viewing at the further user client 320 the session recording 410 of the terminated session 312 of the user continuation link 220. According to an alternative embodiment, the intermediate broker 100 displays, at the further user client 320, the session recording 410 of the terminated user session 312 of the user continuation link 220 before continuation of the application session 210 as the further user session 322 at the further user client 320. The intermediate broker 100 provides the recording module 400 with the further user session 322 and the recording module 400 records the further user session 322 in a session recording 412. The recording module 400 records a canvas stream and/or client user input stream in the session recording 412. The recording module 400 is a unit independent from the intermediate broker 100 and from the application server 200. According to an alternative embodiment, upon activation of the session continuation link 220, the intermediate broker 100 comprises the recording module 400. According to a further alternative embodiment, one or more application servers 200 comprise the recording module 400. The recording module optionally aggregates the session recording 410 and the at least one further session recording 412 in an aggregated session recording 420.

Figure 4:
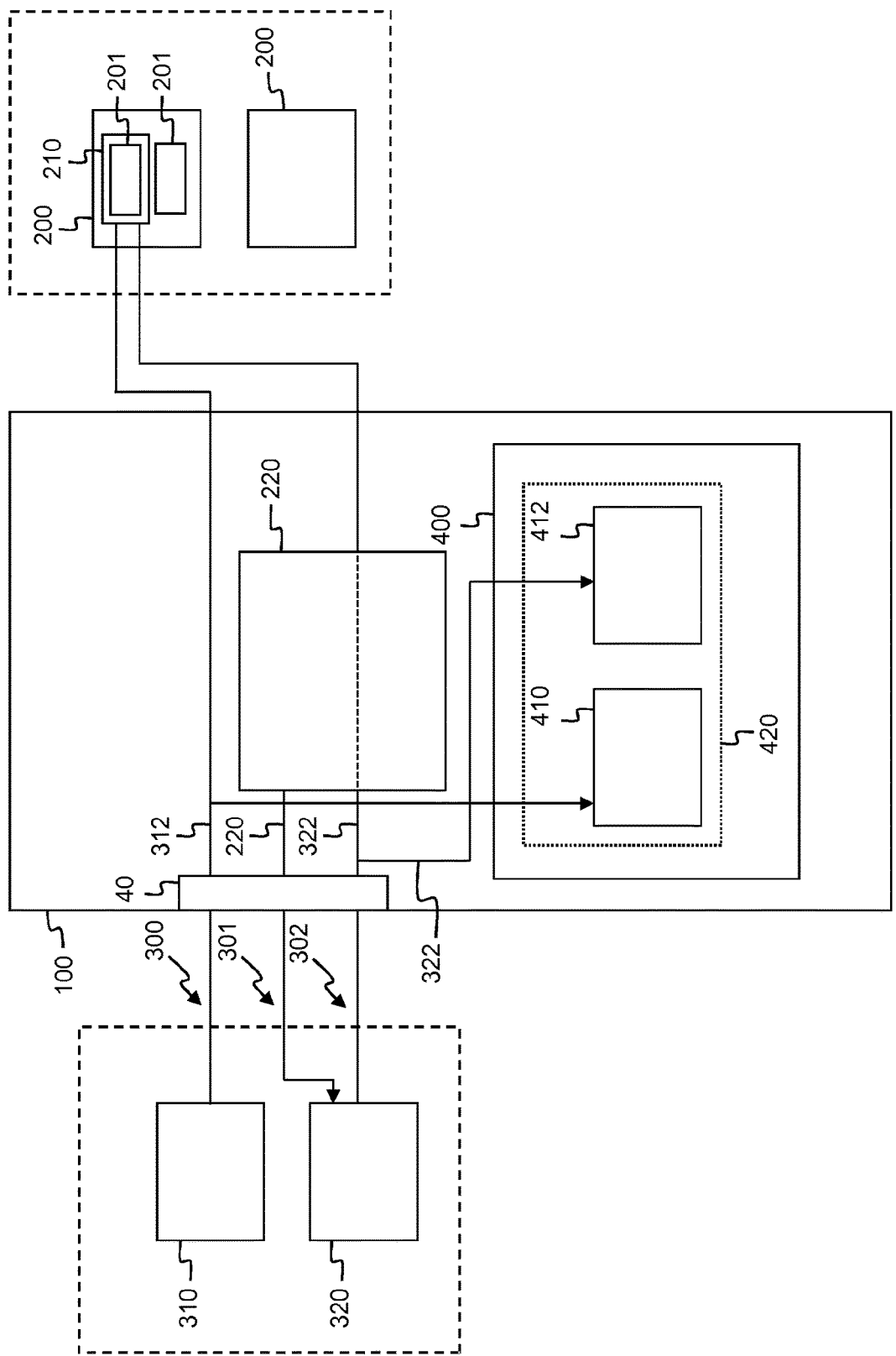
FIG. 4 schematically illustrates an embodiment of a system for operating an intermediate broker with multi-session recording wherein the intermediate broker comprises the recording module.

According to an embodiment shown in FIG. 4, a system according to the present invention comprises a user client 310, a further user client 320, an intermediate broker 100 and an application server 200. The user client 310 is for example a browser in which an application 201 is launched, for example a first browser, and the further user client 320 is for example a different browser in which the same application 201 is launched, for example a different browser than the first browser. According to an alternative embodiment, the user client 310 is for example a browser of a first electronic device of a user, for example of a desktop computer or of a laptop or of a tablet or of a smartphone or of a smartwatch, and the further user client 320 is for example a browser of another electronic device of the same user different from the first electronic device, for example the desktop computer or the laptop or the tablet or the smartphone or the smartwatch of the same user. The application server 200 comprises a plurality of applications 201. The intermediate broker 100 is for example a web broker. The intermediate broker 100 provides an application session 210 on an application server 200 as a user session 312 to the user client 310. The intermediate broker 100 comprises an application streamer 40 which generates a representation of a web page 300 incorporating the application session 210 and streams the representation of the web page 300 to the user client 310. The intermediate broker 100 further comprises a recording module 400. The recording module 400 records the user session 312 in a session recording 410. The recording module 400 records a canvas stream and/or client user input stream in the session recording 410. Upon termination of the user session 312 of the user client 310, the intermediate broker 100 provides a session continuation link 220 for continuing the application session 210 to the further user client 320. The recording module 400 still comprises the session recording 410. The application streamer 40 generates a representation of a web page 301 incorporating the session continuation link 220 and streams the representation of the web page 301 to the further user client 320. Upon activation of the session continuation link 220, the intermediate broker 100 continues the application session 210 of the user session 312 of FIG. 1 on the application server 200 as a further user session 322 to the further user client 320. The application streamer 40 generates a representation of a web page 302 incorporating the application session 210 and streams the representation of the web page 302 to the further user client 320. Upon activation of the session continuation link 220, the intermediate broker 100 provides the option of viewing at the further user client 320 the session recording 410 of the terminated session 312 of the user continuation link 220. According to an alternative embodiment, upon activation of the session continuation link 220, the intermediate broker 100 displays, at the further user client 320, the session recording 410 of the terminated user session 312 of the user continuation link 220 before continuation of the application session 210 as the further user session 322 at the further user client 320. The recording module 400 records the further user session 322 in a session recording 412. The recording module 400 records a canvas stream and/or client user input stream in the session recording 412. According to an alternative embodiment, one or more application servers 200 comprise the recording module 400. The recording module optionally aggregates the session recording 410 and the at least one further session recording 412 in an aggregated session recording 420.

Figure 5:
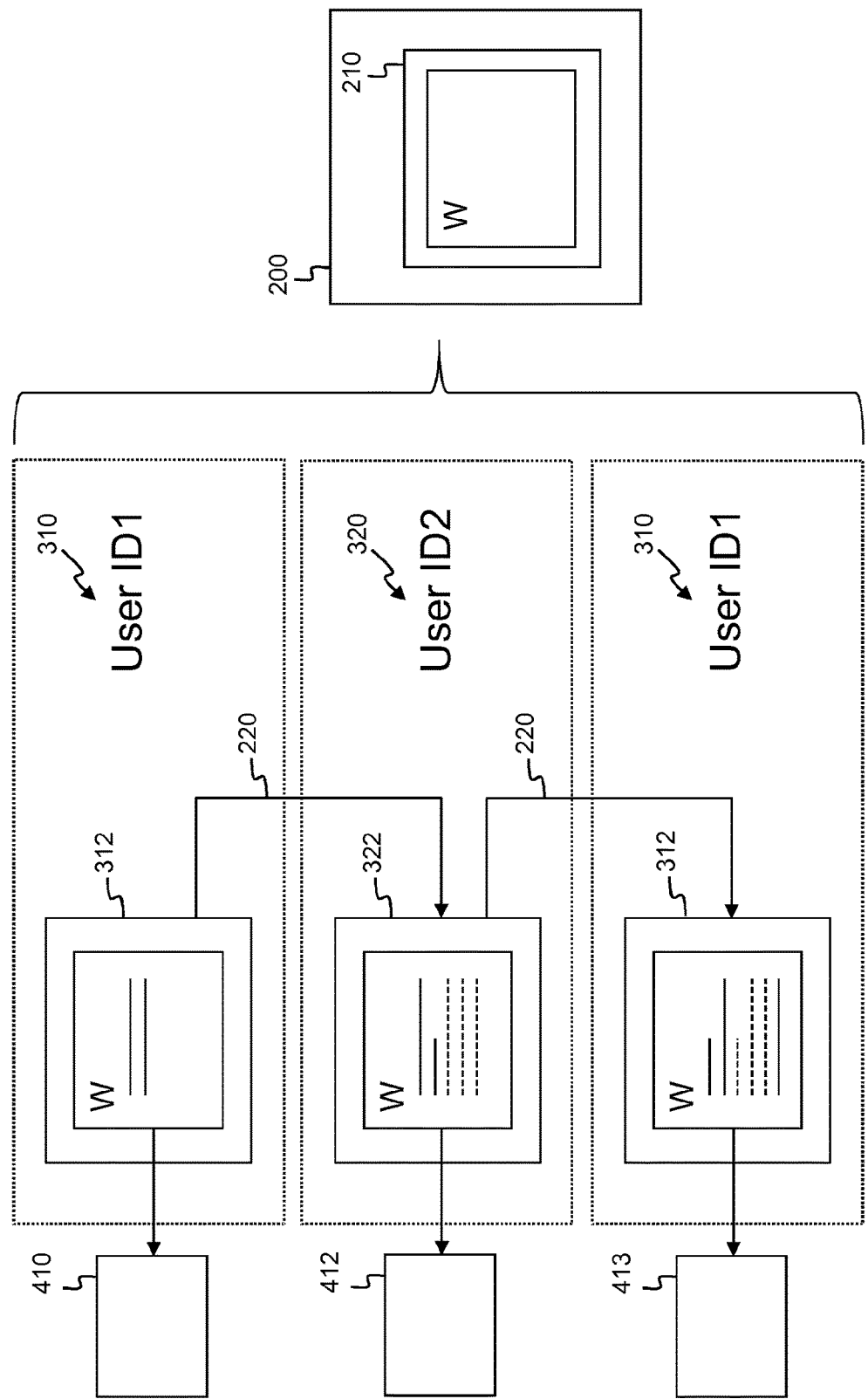
FIG. 5 schematically illustrates an embodiment of a system for operating an intermediate broker with multi-session recording of an application session on an application server.

FIG. 5 shows an example of a multi-session recording according to the present invention. A user client 310 with a user ID1 is provided an application session 210 of an application 201 on an application server 200 as a user session 312. For example, the application 201 is Word. A user of the user client 310 with the user ID1 types two lines of text in Word in his user session 312. A recording module records the user session 312 in a session recording 410. The user client 310 with the user ID1 then terminates his user session 312. Upon termination of the user session 312, an intermediate broker provides a session continuation link 220 to a further user client 320 with a user ID2 for continuing the application session 210. Upon activation of the session continuation link 220, the intermediate broker continues the application session 210 on the application server 200 as a further user session 322 to the further user client 320 with the user ID2. A user of the further user client 320 with the user ID2 modifies at least partially the text of the second of the two lines typed by a user of the user client 310 and types three additional lines of text. The recording module records the further user session 322 in a further session recording 412. The further user client 320 with the user ID2 then terminates his further user session 322. Upon termination of the further user session 322, the intermediate broker provides a session continuation link 220 back to the user client 310 with the user ID1 for continuing the application session 210. Upon activation of the session continuation link 220, the intermediate broker continues the application session 210 on the application server 200 as a next further user session 312 to the user client 310 with the user ID1. A user of the user client 310 with the user ID1 modifies at least partially the text of the first and the second of the two lines typed by a user of the user client 310 and modifies at least partially the text of the first of the three lines typed by a user of the further user client 320 and the user of the user client 310 types one additional line of text. The recording module records the user session 312 in a further session recording 413.

Figure 6:
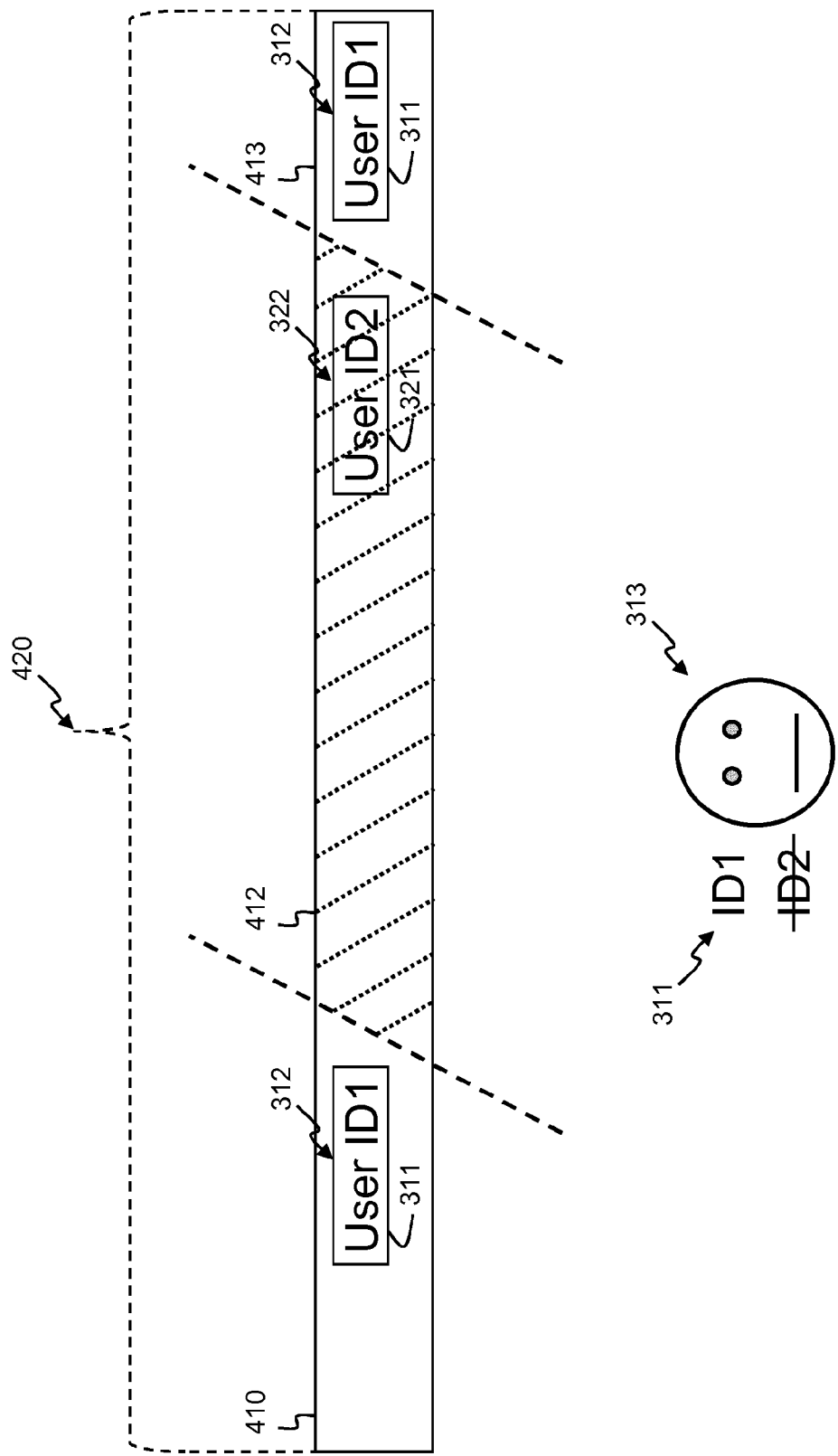
FIG. 6 schematically illustrates an embodiment of an aggregated session recording of a multi-session recording according to the present invention.

FIG. 6 schematically illustrates an embodiment of an aggregated session recording of a multi-session recording according to the present invention. For example, the multi-session recording is similar to the one schematically illustrated on FIG. 5. Components with identical reference numbers as on FIG. 5 fulfill the same function. A user client 310 is provided an application session 210 of an application 201 on an application server 200 as a user session 312. For example, the application 201 is Word. A user 313 of the user client 310 with the user ID1 311 types two lines of text in Word in his user session 312. A recording module records the user session 312 in a session recording 410. The recording module stores the session recording 410 and the user ID1 311 associated with the session recording 410. The user client 310 then terminates the user session 312. Upon termination of the user session 312, an intermediate broker provides a session continuation link 220 to a further user client 320 for continuing the application session 210. Upon activation of the session continuation link 220, the intermediate broker continues the application session 210 on the application server 200 as a further user session 322 to the further user client 320. A user of the further user client 320 with the user ID2 321 modifies at least partially the text of the second of the two lines typed by a user 313 of the user client 310 with user ID1 311 and types three additional lines of text. The recording module records the further user session 322 in a further session recording 412. The recording module stores the further session recording 412 and the user ID2 321 associated with the further session recording 412. The further session recording 412 is separate from the session recording 410. In other words, the further session recording 412 is recorded independently from the session recording 410 by the recording module of the present invention. The further user client 320 then terminates the further user session 322. Upon termination of the further user session 322, the intermediate broker provides a session continuation link 220 back to the user client 310 for continuing the application session 210. Upon activation of the session continuation link 220, the intermediate broker continues the application session 210 on the application server 200 as a next further user session 312 to the user client 310. However, in the case of FIG. 6, the user 313 of the user client 310 does not own permissions to replay the further session recording 412 of the further user session 322. The user 313 is therefore not allowed to view the further session recording 412 and the intermediate broker blocks the display of the further session recording 412 to the user 313 of the user session 312. The user 313 of the user client 310 with the user ID1 311 modifies at least partially the text of the first and the second of the two lines that he had previously typed. The recording module records the user session 312 in a next further session recording 413. The recording module stores the next further session recording 413 and the user ID1 311 associated with the next further session recording 413. The user client 310 then terminates the user session 312. The recording module then aggregates the session recording 410, the further session recording 412 and the next further session recording 413 in an aggregated session recording 420. It is clear from FIG. 6 that the session recording 410, the further session recording 412 and the next further session recording 413 are separate from each other and are aggregated in an aggregated session recording 420. It is also clear from FIG. 6 that users may replay parts and/or view an entire session recording, and/or replay part and/or view at least one entire further session recording, depending on the permissions associated with each user ID, depending on which the intermediate broker prevents viewing or not of parts or of the entire session recording 410 and/or of the further session recording 412 and/or of the next further session recording 413, and that it is possible that a user is allowed to only view one or more parts of the aggregated session recording 420 depending on the user permissions associated with his user ID.

Figure 7:
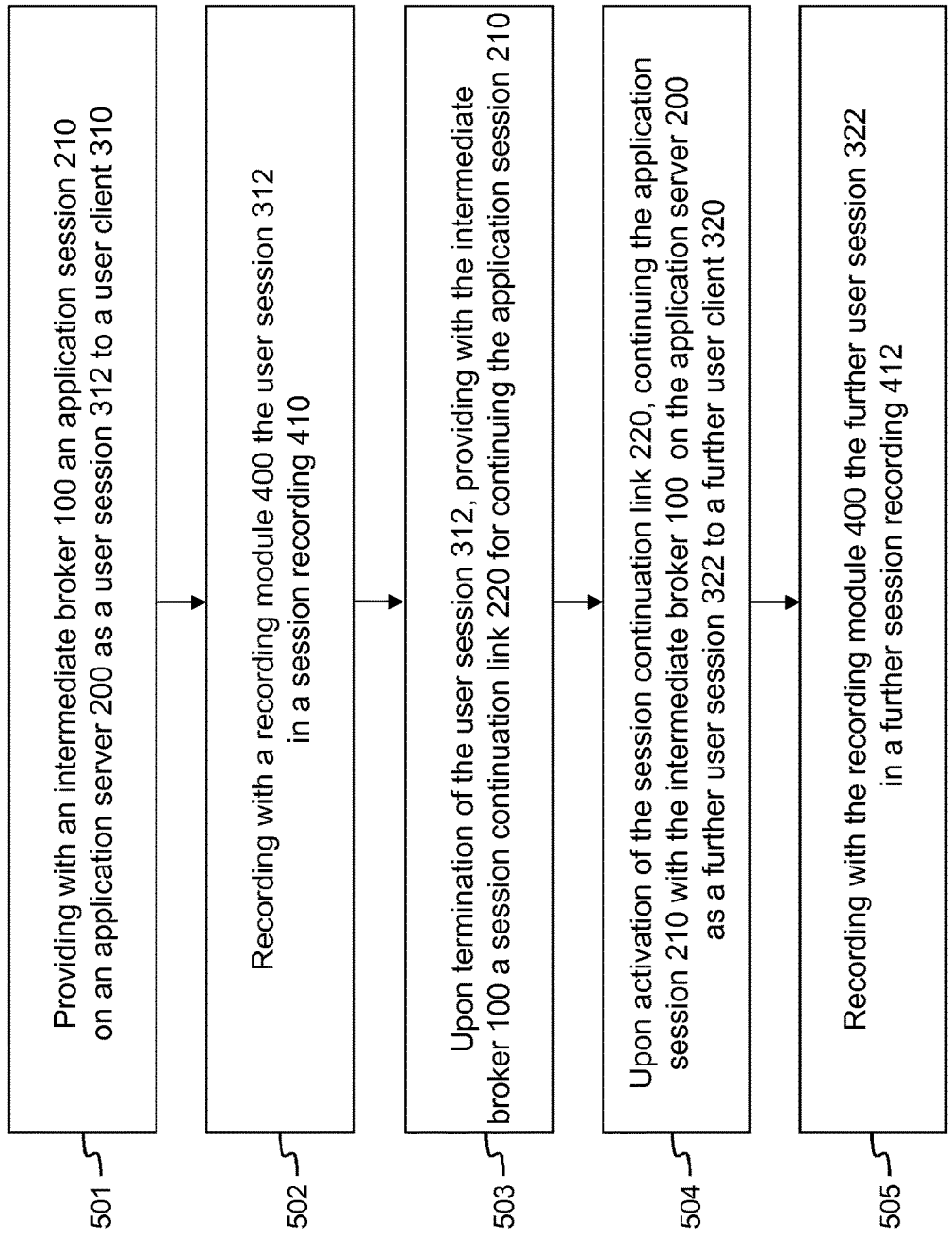
FIG. 7 schematically illustrates an embodiment of the steps of the method according to the present invention.

FIG. 7 schematically illustrates the steps of the method according to the present invention for operating an intermediate broker 100 with multi-session recording. The method comprises the first step 501 of providing with an intermediate broker 100 an application session 210 on an application server 200 as a user session 312 to a user client 310. In step 502, a recording module 400 records the user session 312 in a session recording 410. Upon termination of the user session 312 in step 503, the intermediate broker 100 provides a session continuation link 220 for continuing the application session 210. Upon activation of the session continuation link 220 in step 504, the intermediate broker 100 continues the application session 210 on the application server 200 as a further user session 322 to a further user client 320. Finally, the recording module 400 records the further user session 322 in a further session recording 412 in step 505.

Figure 8:
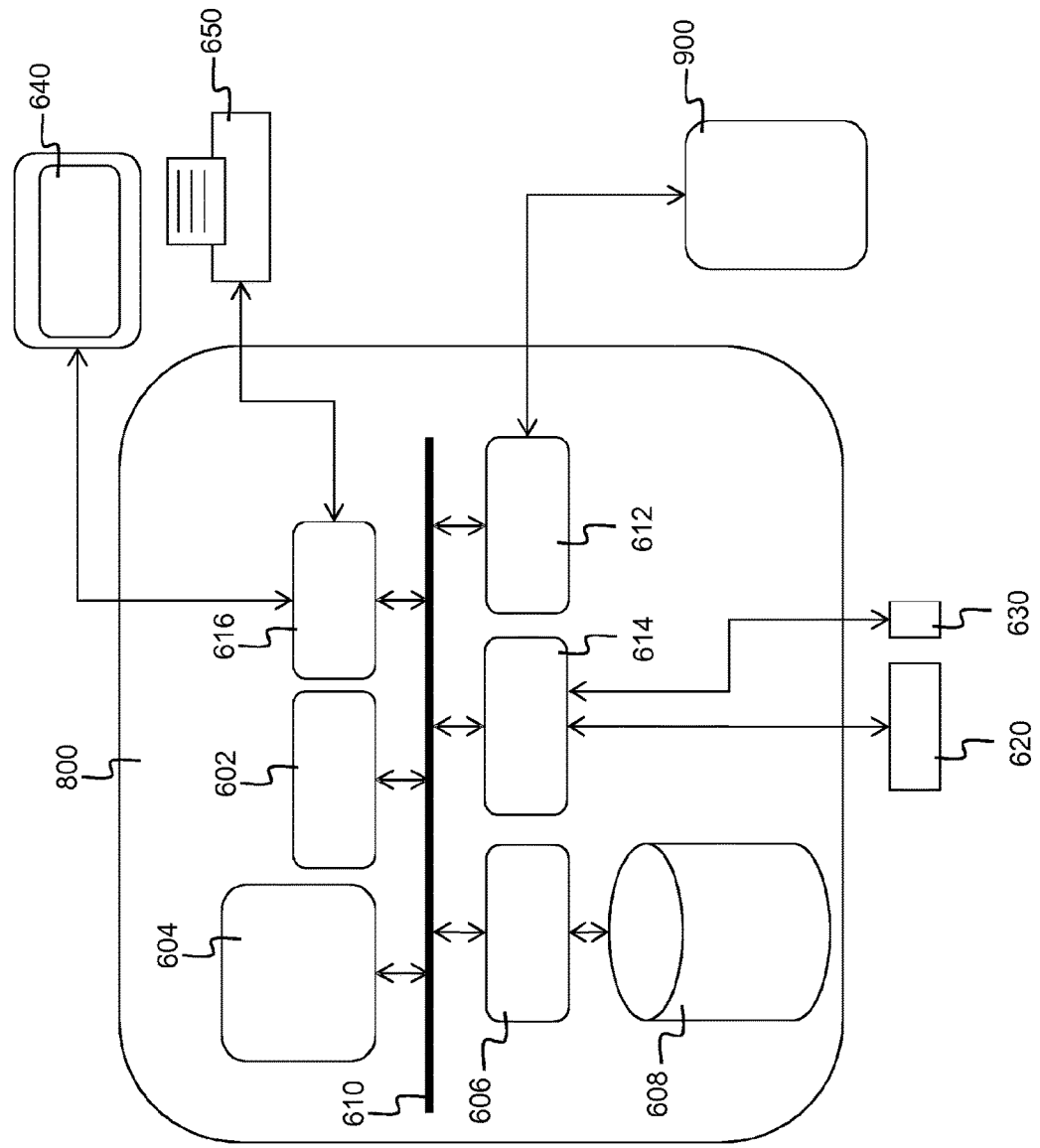
FIG. 8 schematically illustrates a suitable computing system for hosting the broker of FIG. 4.

FIG. 8 shows a suitable computing system 800 for hosting the web broker of FIG. 4. Computing system 800 may in general be formed as a suitable general purpose computer and may comprise a bus 610, a processor 602, a local memory 604, one or more optional input interfaces 614, one or more optional output interfaces 616 a communication interface 612, a storage element interface 606 and one or more storage elements 608. Bus 610 may comprise one or more conductors that permit communication among the components of the computing system. Processor 602 may include any type of conventional processor or microprocessor that interprets and executes programming instructions. Local memory 604 may include a random access memory (RAM) or another type of dynamic storage device that stores information and instructions for execution by processor 602 and/or a read only memory (ROM) or another type of static storage device that stores static information and instructions for use by processor 604. Input interface 614 may comprise one or more conventional mechanisms that permit an operator to input information to the computing device 800, such as a keyboard 620, a mouse 630, a pen, voice recognition and/or biometric mechanisms, etc. Output interface 616 may comprise one or more conventional mechanisms that output information to the operator, such as a display 640, a printer 650, a speaker, etc. Communication interface 612 may comprise any transceiver-like mechanism such as for example two 1 Gb Ethernet interfaces that enables computing system 800 to communicate with other devices and/or systems, for example mechanisms for communicating with one or more other computing systems 900. The communication interface 612 of computing system 800 may be connected to such another computing system by means of a local area network (LAN) or a wide area network (WAN, such as for example the internet, in which case the other computing system 680 may for example comprise a suitable web server. Storage element interface 606 may comprise a storage interface such as for example a Serial Advanced Technology Attachment (SATA) interface or a Small Computer System Interface (SCSI) for connecting bus 610 to one or more storage elements 608, such as one or more local disks, for example 1 TB SATA disk drives, and control the reading and writing of data to and/or from these storage elements 608. Although the storage elements 608 above is described as a local disk, in general any other suitable computer-readable media such as a removable magnetic disk, optical storage media such as a CD or DVD, -ROM disk, solid state drives, flash memory cards, . . . could be used.

The broker of FIG. 4 can be implemented as programming instructions stored it local memory 604 of the computing system 800 for execution by its processor 602. Alternatively the web broker of FIG. 4 could be stored on the storage element 608 or be accessible from another computing system 900 through the communication interface 612.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for operating an intermediate broker with multi-session recording, wherein the method comprises the steps of:
   an intermediate broker providing an application session on an application server as a user session to a user client, the intermediate broker hosted on a computer system;
   a recording module recording the user session in a session recording;
   upon termination of the user session, the intermediate broker providing a session continuation link for continuing the application session;
   upon activation of the session continuation link, the intermediate broker continuing the application session on the application server as a further user session to a further user client: and
   the recording module recording the further user session in a further session recording.

2. The computer-implemented method according to claim 1, wherein said session recording and at least one further session recording are separate from each other.

3. The computer-implemented method according to claim 1, wherein the recording module aggregates the session recording and the at least one further session recording in an aggregated session recording.

4. The computer-implemented method according to claim 1, wherein, upon activation of the session continuation link, the intermediate broker provides the option of viewing at the further user client, the session recording of the terminated user session of the user continuation link.

5. The computer-implemented method according to claim 4, wherein upon activation of the session continuation link, the intermediate broker displays, at the further user client, the session recording of the terminated user session of the user continuation link, before continuation of the application session as the further user session at the further user client.

6. The computer-implemented method according to claim 3, wherein, upon activation of the session continuation link of a previous further user session, the intermediate broker provides the option of viewing, at the next further user client, the aggregated session recording of the terminated previous further user session of the user continuation link.

7. The computer-implemented method according to claim 6, wherein, upon activation of the session continuation link of a previous further user session, the intermediate broker displays, at the next further user client, the aggregated session recording of the terminated previous further user session of the user continuation link.

8. The computer-implemented method according to claim 3, wherein, after termination of the further user session, the intermediate broker provides the option of viewing, at the user client of the previous user session, the aggregated session recording.

9. The computer-implemented method according to claim 1, wherein:
said recording module is further adapted to store a user identity, user ID, associated with a session recording and to store a further user ID associated with a further session recording; and
said intermediate broker is further configured to prevent viewing of a session recording or at least one further session recording in function of user permissions to view said session recording and/or said further session recording in function of associated user IDs.

10. The computer-implemented method according to claim 9, wherein said intermediate broker is further configured to prevent viewing of parts of said aggregated session recording in function of said associated user IDs.

11. The computer-implemented method according to claim 1, wherein:
said recording module records only selected parts of said user session in said session recording; and
upon activation of the session continuation link, said intermediate broker provides the option of viewing at the further user client, the session recording of the terminated user session of the user continuation link.

12. The computer-implemented method according to claim 1, wherein said session recording comprises one or more of the following:
one or more screenshots of said user session;
one or more keystrokes of said user session;
one or more events generated by a pointer of said user client and corresponding positions of said pointer in said user session;
one or more events generated on said user client via a touch screen; and
one or more audio tracks of the user session.

13. A system for operating an intermediate broker with multi-session recording, said system performing the computer-implemented method according to claim 1.

14. An intermediate broker according to claim 13, wherein said recording module runs on said intermediate broker.

15. The intermediate broker according to claim 14, wherein said intermediate broker comprises an application streamer adapted to:
generate a representation of a web page incorporating said application session; and
stream said representation of said web page to said user client and/or to said further user client.

16. The intermediate broker according to claim 14, wherein said recording module records one or more of the following in said session recording:
canvas stream; and
client user input stream.

* * * * *